Inventors:
Eugen Renz
Helmut Widder
Hubert Rothert

By: Spencer & Kaye
Attorneys

United States Patent Office 3,521,094
Patented July 21, 1970

3,521,094
COOLING DEVICE FOR ELECTRICAL MACHINE ROTORS
Eugen Renz, Mulheim (Ruhr), Helmut Widder, Essen (Ruhr), and Hubert Rothert, Berlin, Germany, assignors to Licentia Patent-Verwaltungs-G.m.b.H., Frankfurt am Main, Germany
Filed Aug. 26, 1968, Ser. No. 755,179
Claims priority, application Germany, Aug. 24, 1967, L 57,283
Int. Cl. H02k 9/19
U.S. Cl. 310—58                                        6 Claims

ABSTRACT OF THE DISCLOSURE

Electrical machine in which the rotor has a stack of laminations carried by a hollow rotor shaft and a plurality of circumferentially distributed, axially extending channels near the wall of the rotor shaft. Such channels extend along substantially the entire length of the stack of laminations and are in communication with each other to form together at least one meander-shaped passage running to and fro along the rotor shaft. Coolant introduced at one terminus of such passage flows therethrough to the other terminus thereof and removes heat from the rotor, particularly from the vicinity of the stack of laminations.

BACKGROUND OF THE INVENTION

In liquid-cooled electrical machines it is known to remove the heat generated in the rotor by introducing the cooling liquid or coolant into a pipe disposed on the side opposite the driving side and inside the hollow rotor shaft and to deliver the coolant to the driving side at the outer periphery of the same pipe in the hollow shaft. From there the coolant is removed in a conventional manner, via channels in the bearing plate, to cool the stator. Sealing elements are provided to seal the rotating shaft against the stationary bearing plate in order to prevent coolant losses.

The removal of heat from the rotor here substantially occurs by delivering the coolant to the outer periphery of the pipe in the hollow shaft. By doing this, heat from the rotor lamination packet is transferred over the entire length of the lamination packet into the hollow shaft. In order to realize a highly intensive heat exchange with the coolant at this point, it is known to construct the inner periphery of the hollow shaft to contain helical cooling channels through which the coolant flows. In this type of rotor cooling arrangement, the speed with which coolant flows is increased many fold and thus also the heat exchange between the rotor and the coolant.

The known cooling arrangement, however, has the drawback that the coolant is heated considerably while it flows from the driving side of the rotor to the side opposite thereto. This results in different temperatures, hence temperature gradients, in the rotor and, particularly in the rotor lamination packet and the windings disposed thereon. Such gradients are detrimental to the rotor and are more disadvantageous and harmful the faster the rotor is operated. Consequently, substantial thermal stresses occur which endanger the operational safety, as well as dependability, of the rotor. Measurements and experiments have shown that in generators having rotors with a high number of revolutions, e.g., up to 24,000 r.p.m., the high amount of waste heat produces thermal stresses within the rotor which do not assure fault free positioning of the windings in the rotor and the maintenance of the inertial state even after a long period of operation.

SUMMARY OF THE INVENTION

It is therefore an object of the present invention to provide an improved, yet relatively simple means for cooling the rotor of electrical machines, particularly in the vicinity of the stack of laminations.

It is another object of the present invention to provide an effective means for cooling the rotor of an electrical machine in a relative uniform manner to avoid the drawbacks described above.

Briefly, the invention provides a construction for an electrical machine rotor in which the stack of laminations of the rotor is carried by a hollow shaft having means in the form of a plurality of circumferentially distributed, axially extending channels located near the wall of the rotor shaft, such channels extending along the entire axial length of the stack of laminations and being in communication with each other to form together at least one meander-shaped passage, which runs to and fro, axially along the shaft. Coolant is introduced into and removed from such passage in order to cool the rotor, particularly in the vicinity of the rotor laminations, by means provided therefor. According to a preferred form of the invention, the coolant is introduced at one terminus of the meander-shaped passage via a centrally disposed conduit in the rotor shaft, and removed from the other terminus of such passage.

The cooling passage according to the present invention is provided with at least three axial channels, an inlet channel, a return flow channel and an outlet channel. These channels together form one channel group of meander-shaped passage. It is understood, of course, that instead of providing only one return flow channel, a plurality of such channels can be provided. To better balance the rotor it has proven to be advisable, however, to provide at least two such cooling passageways near the periphery or circumferential wall of the rotor shaft. Each cooling passageway, as explained, includes an inlet channel, return flow channel and outlet channel. By this arrangement, particularly where a plurality of such passageways are provided, excellent and relatively uniform heat distribution is realized within the rotor.

DETAILED DESCRIPTION OF PREFERRED EMBODIMENT

Figure 1:
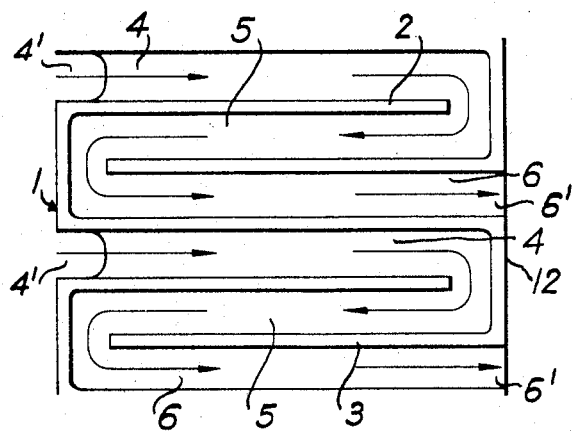
FIG. 1 shows a development view of the periphery of the rotor shaft according to the present invention showing two meander-shaped passageways.
Figure 2:
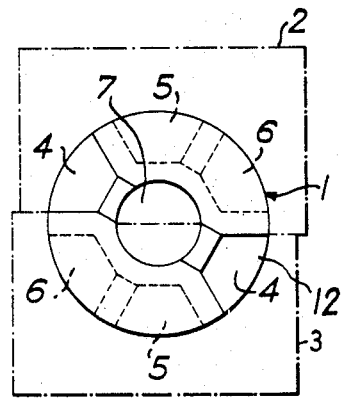
FIG. 2 is a side view of the meander-shaped passageways of FIG. 1.
Figure 3:
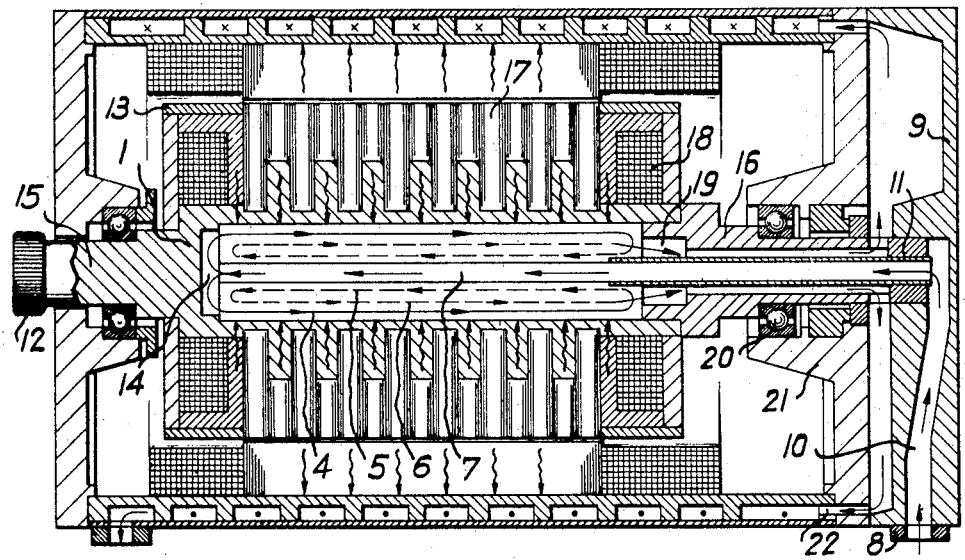
FIG. 3 is a schematic view of a cooling arrangement like that in FIGS. 1 and 2 for a liquid-cooled generator.

Referring to FIGS. 1 and 2, the rotor cooling arrangement is generally designated as 1 and includes channel groups or meander-shaped passageways 2 and 3. Each of the passageways 2 and 3, respectively, includes an inlet channel having an inlet terminus 4', a return flow channel 5 and an outlet channel 6 having an outlet terminus 6'. The channels 4, 5 and 6 extend axially with respect to the hollow rotor shaft 12 (as shown in FIG. 3) and are circumferentially distributed on the shaft 12 in such a manner that the liquid coolant flowing through inlet terminus 4' of each channel 4 flows out through outlet terminus 6' of each channel 6. The direction in which the coolant flows, when it is introduced into the cooling arrangement 1, is the same direction in which it flows when it leaves the cooling arrangement 1. This is accomplished by meander-shaped passageways 2 and 3. When the coolant flows in return flow channel 5, it flows in a direction opposite to that in which it enters and leaves the cooling arrangement 1. The cooling arrangement 1 is also provided a bore or conduit 7, preferably centrally disposed with respect to the cooling arrangement 1, i.e., the meander-shaped passageways 2 and 3 thereof. The conduit 7 is located in the center of the hollow rotor shaft 12 and serves to receive a coolant supply pipe 11 which extends into the hollow shaft 12 of the rotor.

Referring to FIG. 3, the cooling arrangement 1, as a whole, is depicted inside the rotor shaft 12. Liquid coolant, indicated by the flow arrows, enters through the inlet feed pipe 8 disposed in the housing 9 and flows into the interior 10 of the generator. From inlet feed pipe 8 the coolant flows through the coolant supply pipe 11 which extends into the hollow shaft 12 of the rotor 13, thence into chamber 14. The hollow shaft 12 consists of two connected parts 15 and 16, part 16 holding the rotor lamination packet 17 with the windings 18. The channels 4, 5 and 6 are arranged within the rotor shaft 12 to form a plurality of circumferentially distributed, axially extending channels located near the outer wall of the rotor shaft. The channels 4, 5 and 6 extend along substantially the entire axial length of the stack of laminations 17 and are in communication with each other to form together at least one meander-shaped passageway running to and fro axially along the shaft 12.

The liquid coolant is introduced by means of the coolant supply pipe 11 and conduit 7 which is an extension thereof into chamber 14. The coolant then flows into each inlet channel 4 by way of inlet terminus 4' (shown in FIG. 1) of the cooling arrangement 1. From inlet channel 4, where the coolant flows in one direction, the coolant flows through the return flow channels 5 in an opposite direction. Leaving the return flow channels 5, the coolant then flows through the outlet channel 6 again in the same direction as it flowed through inlet channels 4. The coolant then leaves the terminus 6' of each of the channels 6 to enter an annular chamber 19 provided in the hollow shaft 12. The coolant then is conducted out of the rotor 13 via a conduit concentrically disposed with respect to the inlet pipe 11 and through bearing 20, bearing plate 21, and into cooling channels 22 of housing 9, there to cool the stator.

The coolant flowing through coolant channels 4, 5 and 6 absorbs the waste heat generated by the rotor windings 18, i.e., along the entire length of the stack of laminations 17. By the arrangement taught by the present invention, not only is waste heat effectively removed, it is removed in a substantially uniform manner thereby reducing the occurrence of thermal stresses in the rotor and the detrimental effects resulting therefrom. This is due to meander-shaped passageways 2 and 3 which are groupings together of the cooling channels 4, 5 and 6. The meander-shaped passageways provide both relatively warm and relatively cool alternately arranged streams of coolant, which flow in opposite axial directions in the cooling arrangement 1. Thus, thermal stresses which would have a detrimental effect on the rotor, particularly in the vicinity of the stack of rotor laminations, are substantially reduced, if not eliminated altogether and the effective life of the rotor is thereby extended.

It will be understood that the above description of the present invention is susceptible to various modifications, changes and adaptations.

We claim:
1. In an electrical machine, the combination which comprises:
   (a) a rotor having a hollow rotor shaft and a stack of laminations carried by said rotor shaft;
   (b) means arranged within said rotor shaft and forming a plurality of circumferentially distributed, axially extending channels located near the outer wall of said rotor shaft, said channels extending along substantially the entire axial length of said stack of laminations, said channels being in communication with each other to form together at least one mander-shaped passage running to and fro axially along said shaft; and
   (c) means for introducing a coolant into said meander-shaped passage at one terminus thereof and for removing the coolant from the other terminus of said passage.

2. An electrical machine as defined in claim 1 wherein said coolant introducing and removing means includes a centrally disposed conduit within said rotor shaft connected to said channels.

3. An electrical machine as defined in claim 2 wherein said consecutive ones of said channels of said meander-shaped passage are, respectively, an inlet channel, a return flow channel and an outlet channel.

4. An electrical machine as defined in claim 3 wherein said channels are connected to each other to form a plurality of meander-shaped passages.

5. An electrical machine as defined in claim 3 wherein said coolant introducing and removing means further includes an inlet chamber in the interior of said rotor shaft and placing said one terminus of said meander-shaped passage in communication with said conduit.

6. An electrical machine as defined in claim 5 wherein said coolant introducing and removing means further includes an outlet chamber in the interior of said rotor shaft and placing said other terminus of said meander-shaped passage in communication with a coolant outlet.

References Cited

UNITED STATES PATENTS

| | | | |
|---|---|---|---|
| 2,991,377 | 7/1961 | Vose et al. | 310—61 |
| 2,381,122 | 8/1945 | Fechheimen | 310—61 |
| 1,733,379 | 10/1929 | Lowy | 310—61 XR |
| 3,075,104 | 1/1963 | Willyoung et al. | 310—64 XR |
| 3,043,901 | 7/1962 | Gebwing et al. | 310—64 XR |
| 3,320,447 | 5/1967 | Bunchieri | 310—61 XR |

J D MILLER, Primary Examiner

B. A. REYNOLDS, Assistant Examiner

U.S. Cl. X.R.

310—61, 65